United States Patent
Park et al.

(10) Patent No.: US 10,191,081 B2
(45) Date of Patent: Jan. 29, 2019

(54) MEASURING METHOD FOR ATOMIC FORCE MICROSCOPE

(71) Applicant: KOREA RESEARCH INSTITUTE OF STANDARDS AND SCIENCE, Daejeon (KR)

(72) Inventors: Byong Chon Park, Daejeon (KR); DalHyun Kim, Daejon (KR); ChaeHo Shin, Hwaseong-si (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 15/238,326

(22) Filed: Aug. 16, 2016

(65) Prior Publication Data
US 2017/0052210 A1    Feb. 23, 2017

(30) Foreign Application Priority Data
Aug. 17, 2015  (KR) .......................... 10-2015-0115182

(51) Int. Cl.
G01Q 60/32    (2010.01)
G01Q 10/06    (2010.01)

(52) U.S. Cl.
CPC .......... *G01Q 60/32* (2013.01); *G01Q 10/065* (2013.01)

(58) Field of Classification Search
CPC ...... G01Q 10/00; G01Q 10/065; G01Q 60/32; G01Q 60/34
See application file for complete search history.

(56) References Cited

U.S. PATENT DOCUMENTS

| 5,283,442 | A | * | 2/1994 | Martin | ................... | G01Q 10/06 |
| | | | | | | 250/559.22 |
| 5,831,961 | A | * | 11/1998 | Sakai | ................... | G11B 9/1436 |
| | | | | | | 369/126 |

(Continued)

FOREIGN PATENT DOCUMENTS

| JP | 2004117225 A | 4/2004 |
| JP | 2011089985 A | 5/2011 |

(Continued)

OTHER PUBLICATIONS

Dai, Gaoliang et al. "New developments at Physikalish Technische Bundesanstalt in three-dimensional atomic force microscopy with tapping and torsion atomic force microscopy mode and vector approach probing strategy." *Journal of Micro/Nanolithography, MEMS, and MOEMS* 11.1 (2012): 011004-1-011004-10.

*Primary Examiner* — Wyatt Stoffa
(74) *Attorney, Agent, or Firm* — Harness, Dickey & Pierce, P.L.C.

(57) ABSTRACT

Provided is a measuring method for an atomic force microscope that scans a surface of a sample with a probe to measure a surface property of the sample, the measuring method including detecting a motion of the probe while vibrating the probe on the surface of the sample, acquiring surface information on the sample by using a variation in the motion of the probe, and controlling the probe by using the surface information on the sample. The surface information on the sample may include a position and a slope of the surface. The vibrating of the probe on the surface of the sample may include performing a circular motion by the probe around axes perpendicular to a scan direction of the probe and to a height direction of the sample.

9 Claims, 5 Drawing Sheets

(56) References Cited

U.S. PATENT DOCUMENTS

| | | | |
|---|---|---|---|
| 6,169,281 B1 * | 1/2001 | Chen | G01Q 60/38 250/216 |
| 6,288,391 B1 * | 9/2001 | Ushioda | G01Q 30/06 850/22 |
| 6,470,738 B2 * | 10/2002 | Narita | B82Y 20/00 250/234 |
| 6,845,655 B2 * | 1/2005 | van der Weide | B82Y 35/00 73/105 |
| 7,123,790 B2 * | 10/2006 | Rosman | B82Y 35/00 385/25 |
| 8,443,460 B2 * | 5/2013 | Foucher | G01Q 40/02 850/19 |
| 2001/0017054 A1 * | 8/2001 | Narita | B82Y 20/00 73/105 |
| 2003/0160170 A1 | 8/2003 | McMaster et al. | |
| 2004/0051542 A1 * | 3/2004 | Miles | B82Y 35/00 250/234 |
| 2006/0013528 A1 * | 1/2006 | Rosman | B82Y 35/00 385/25 |
| 2006/0254348 A1 * | 11/2006 | Watanabe | B82Y 35/00 73/105 |
| 2007/0272005 A1 * | 11/2007 | Abe | B82Y 35/00 73/105 |
| 2008/0083270 A1 * | 4/2008 | Mancevski | B82Y 10/00 73/105 |
| 2011/0093990 A1 | 4/2011 | Foucher et al. | |
| 2012/0050718 A1 * | 3/2012 | Dazzi | B82Y 35/00 356/51 |
| 2013/0047302 A1 * | 2/2013 | Noel | B82Y 35/00 850/6 |

FOREIGN PATENT DOCUMENTS

| | | |
|---|---|---|
| KR | 20030015220 A | 2/2003 |
| KR | 20050043885 A | 5/2005 |

* cited by examiner

MEASURING METHOD FOR ATOMIC FORCE MICROSCOPE

CROSS-REFERENCE TO RELATED APPLICATIONS

This U.S. non-provisional patent application claims priority under 35 U.S.C. § 119 of Korean Patent Application No. 10-2015-0115182 filed on Aug. 17, 2015, the entire contents of which are hereby incorporated by reference.

BACKGROUND

The present disclosure herein relates to a measuring method for an atomic force microscope, and more particularly, to a dithering method for a probe in a measuring method for an atomic force microscope (AFM).

The AFM is high-precision surface analysis equipment that uses the interaction force between atoms to measure the shape of a sample surface on an atom basis. The AFM includes cantilever for measuring a sample, and a sharp probe or tip is suspended from the end part of the cantilever. The end of the probe has a size corresponding to a few atoms (e.g., several nanometers) and is significantly sharp. When the probe approaches the sample surface, attracting or pushing force (attractive or repulsive force) acts according to the gap between an atom at the tip of the probe and an atom on the sample surface.

The probe may scan the surface of a substrate in a contact mode, non-contact mode or an intermittent contact mode. The AFM may image and represent a variation in the rising and falling position of the probe. Besides, the AFM may be applied in various manners to be capable of being measuring the frictional force, hardness, magnetic property, electrical property, electro-chemical property, capacitance, etc. of the substrate surface.

Since a typical AFM technology measures a shape having a 3D pattern through proportional integral derivative control (PID control), it experiences sidewall-chattering. Many studies for overcoming the limitation of the measurement by the artificial intelligence 3D control of the probe are being performed. A typical AFM uses raster scanning that feeds back and scans only in a direction perpendicular to the side of the sample, and measures the surface of the sample through a modulation signal varying while dithering in a direction perpendicular to the side of the sample. This method may measure only a measurement position from the signal from the probe and not discern the slope of the surface of the sample. Thus, there is a need for a lot of control according to the slope of the surface of the sample. Also, there are limitations in that the typical technology is sensitive to an electrostatic force by a long range force that occurs when the probe approaches the sample, and a variation in drift according to a variation in external environment increases.

SUMMARY

The present disclosure provides a measuring method for an artificial intelligence atomic force microscope that enhances accuracy and stability in measurement.

The tasks to be solved by the present disclosure are not limited to the above-mentioned tasks, and other tasks that are not mentioned may be clearly understood by a person skilled in the art from the following description.

An embodiment of the inventive concept provides a measuring method for an atomic force microscope that scans a surface of a sample with a probe to measure a surface property of the sample, the measuring method including detecting a motion of the probe while vibrating the probe on the surface of the sample, acquiring surface information on the sample by using a variation in the motion of the probe, and controlling the probe by using the surface information on the sample.

In an embodiment, the surface information on the sample may include a position and a slope of the surface.

In an embodiment, the vibrating of the probe on the surface of the sample may include performing a circular motion by the probe around axes perpendicular to a scan direction of the probe and to a height direction of the sample.

In an embodiment, the circular motion of the probe may be provided by a first oscillating unit that makes a vibration in the scan direction of the probe, and a second oscillating unit that makes a vibration in the height direction of the sample.

In an embodiment, the vibrations that are made by the first oscillating unit and the second oscillating unit may have a same frequency and amplitude, wherein the vibrations mutually have a phase difference of about 90°.

In an embodiment, the vibrations that are made by the first oscillating unit and the second oscillating unit may have a frequency of about 100 kHz to about 1 MHz.

In an embodiment, the acquiring of the surface information on the sample by using the variation in the motion of the probe may be performed in a single vibration cycle of the vibration of the probe.

In an embodiment, the acquiring of the surface information on the sample by using the variation in the motion of the probe may include measuring a variation in a frequency, amplitude or phase in the scan direction of the probe from the circular motion of the probe, measuring a variation in a frequency, amplitude or phase in the height direction of the sample from the circular motion of the probe, calculating a variation in interaction between the surface of the sample and the probe through the variation in the frequency, amplitude or phase of the circular motion of the probe, and acquiring the slope of the surface through the variation in the interaction between the surface of the sample and the probe.

In an embodiment, the controlling of the probe by using the surface information on the sample may include modifying a movement path of the probe through a feed forward algorithm, and moving the probe along the modified movement path.

In an embodiment, the feed forward algorithm may include using measurement information on the surface of the sample to modify the movement path to allow a direction of movement of the probe to follow a direction of tangent line of the surface of the sample at each measurement point.

In an embodiment, the AFM may further include a control unit, wherein the control unit automatically performs detecting the variation in the motion of the probe by interaction acting between the probe and the sample, acquiring surface information that includes the position of the sample and the slope of the surface, and controlling the probe by using the surface information.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In order to fully understand the configuration and effect of the inventive concept, exemplary embodiments of the inventive concept are described with reference to the accompanying drawings. However, the inventive concept is not limited to embodiments disclosed below, but may be embodied in many forms and implement many changes. Rather, the description of the embodiments is provided so that the disclosure of the inventive concept is complete and the scope of the inventive concept is completely conveyed to a person skilled in the art to which the inventive concept pertains. A person skilled in the art would understand that the concept of the inventive concept may be performed in any suitable environment. Like reference numerals refer to like components throughout the specification.

The terms used herein are only for explaining embodiments, not limiting the inventive concept. The terms in a singular form in the specification also include plural forms unless otherwise specified. The term 'comprises' and/or 'comprising' used in the specification means that a component, step, operation and/or element that has been mentioned does not exclude the existence or addition of one or more other components, steps, operations and/or elements.

When the specification mentions mentioned that any surface (or layer) or substrate is on another surface (or layer), it may be formed directly on the other surface (or layer) or substrate or a third surface (or layer) may also be interposed inbetween.

Although the terms first, second, third, etc. are used in various embodiments of the inventive concept in order to describe various regions, surfaces (or layers), etc., these regions or surfaces are not limited by these terms. These terms are only used in order to distinguish any predetermined region or surface (layer) from another region or surface (or layer). Thus, a surface mentioned as a first surface in any one embodiment may also be mentioned as a second surface in another embodiment. Embodiments that are described and illustrated herein also include their complementary embodiments. Throughout the specification, parts represented by like reference numerals represent like components.

Also, embodiments in the specification are described with reference to cross-sectional views and/or plan views that are ideal, exemplary views of the inventive concept. The thicknesses of films and regions in the drawings are exaggerated for the effective description of technical content. Thus, the forms of exemplary views may vary depending on fabrication technologies and/or tolerances. Thus, embodiments of the inventive concept are not limited to shown specific forms and also include variations in form produced according to manufacturing processes. For example, an etch region shown in a rectangular shape may have a round shape or a shape having a predetermined curvature. Thus, regions illustrated in the drawings have rough attributes and the shapes of the regions illustrated in the drawings are intended to illustrate the specific shapes of the regions of elements and not to limit the scope of the inventive concept.

The terms used in embodiments of the inventive concept may be construed as meaning typically known to a person skilled in the art unless otherwise defined.

Hereinafter, embodiments of the inventive concept are described with reference to the accompanying drawings to describe the inventive concept in detail.

A measuring method for an atomic force microscope (AFM) according to an embodiment of the inventive concept is applied to an atomic microscope that scans the surface of a sample with a probe to measure the surface property of the sample. The measuring method for the AFM according to an embodiment of the inventive concept may use an intermittent contact mode in which a cantilever having a probe or tip at one end thereof vibrates near the resonance frequency of the cantilever on the surface of the sample.

Figure 1:
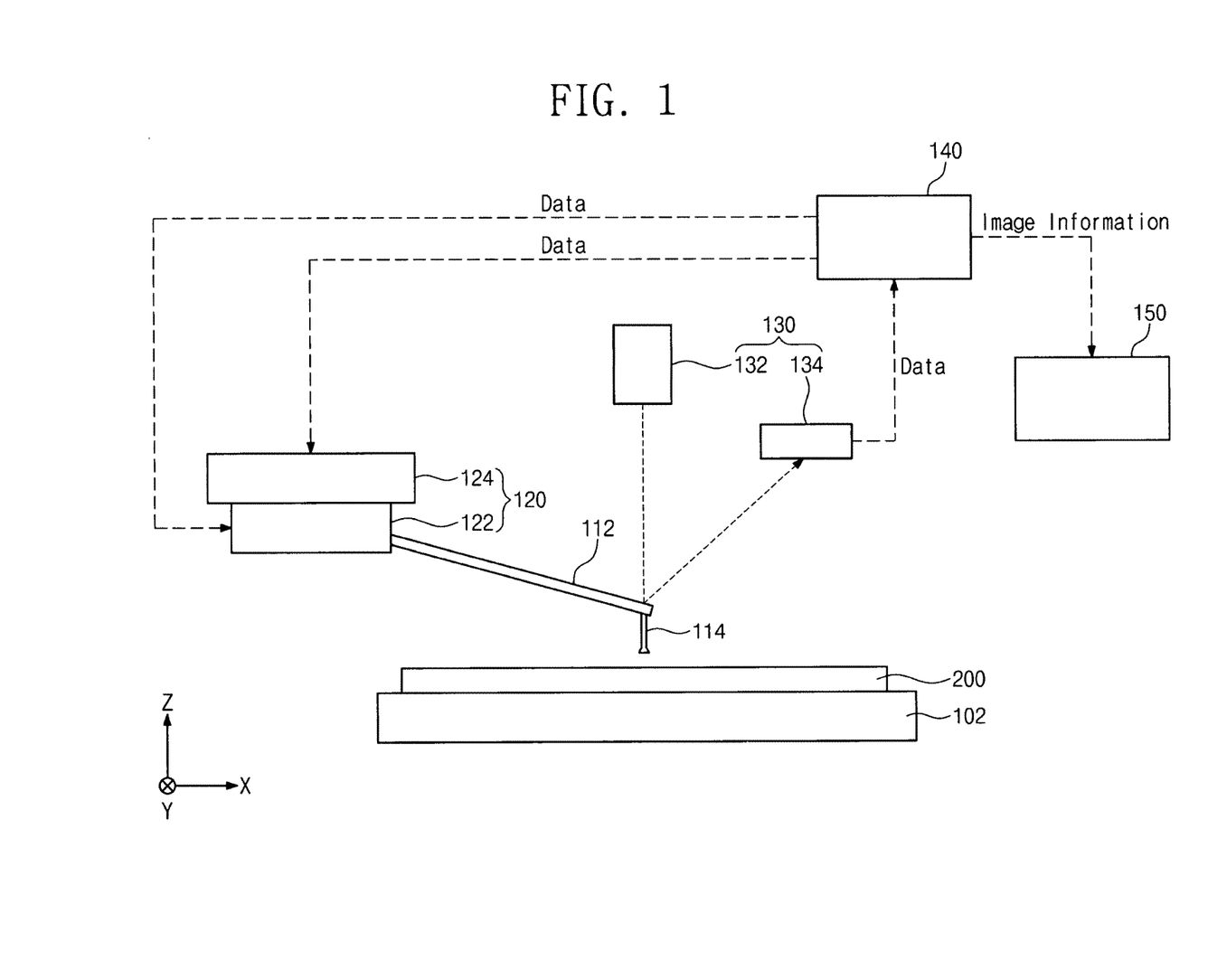
FIG. 1 is a schematic diagram of an atomic force microscope (AFM)

FIG. 1 is a schematic diagram of the AFM. Referring to FIG. 1, the AFM used in an embodiment of the inventive concept may include a stage 102 which a sample 200 is loaded thereon, a cantilever 112 having a probe 114 facing the sample 200, an actuating unit 120 that includes an oscillating unit 122 vibrating the cantilever 112 and a moving unit 124 moving the cantilever 112, a measuring unit 130 measuring the surface property of the sample 200 by using the interaction between the probe 114 and the sample 200, a control unit 140 that analyzes the surface property of the sample 200 and controls the probe 114, and a display unit 150 that displays surface information on the sample 200 as an image.

The sample 200 may be loaded onto the stage 102. For example, the stage 102 may support the sample 200.

The cantilever 112 may be disposed over the stage 102. The probe 114 may be connected to one end of the cantilever 112 adjacent to the stage 102. The actuating unit 120 may be connected to the other end of the cantilever 112.

The probe 114 may move to come close to the surface of the sample 200 loaded onto the stage 102, according to the movement of the cantilever 112. When the probe 114 comes close to the surface of the sample 200, the surface of the sample 200 may be detected by using the interaction between the sample 200 and the probe 114. The interaction is caused by a physical quantity that acts between the probe 114 and the sample 200, and the physical quantity that acts between the sample 200 and the probe 114 may be attractive force between an atom on the surface of the sample 200 and an atom at a tip of the probe 114. For example, the attractive force between the surface of the sample 200 and the probe 114 may include van der Waals force.

The actuating unit 120 may include the oscillating unit 122 and the moving unit 124. The oscillating unit 122 may include a first oscillating unit (not shown) and a second oscillating unit (not show) that are individually actuated each other. The first and second oscillating units (not shown) may allow the cantilever 112 to vibrate. As the cantilever 112 vibrates, the probe 114 connected to one end of the cantilever 112 may also vibrate. In other words, the probe 114 may perform dithering. Herein, the dithering is defined as artificially generating the relative motion between the probe 114 and the surface of the sample 200 in order to easily measure how the probe 114 moves by the interaction with the sample 200. The first oscillating unit (not shown) and the second oscillating unit (not shown) may include a piezo-stack or piezo-tube.

The moving unit 124 may move the cantilever 112 on the sample 200. For example, the moving unit 124 may precisely move the cantilever 112 in a direction parallel to the surface of the sample 200. For example, the moving unit 124 may regulate the height of the cantilever 112 in the height direction of the surface of the sample 200. That is, the probe 114 connected to the cantilever 112 may scan the surface of the sample 200 by the moving unit 124. The moving unit 124 may include one or a plurality of scanners (not shown), and the scanner (not shown) may include a linear motor, ball screw, piezo-stack or inchwarm. Although FIG. 1 shows that the moving unit 124 makes up the actuating unit 120 along with the oscillating unit 122, it is possible to implement various variations different therefrom. For example, the moving unit 124 may be coupled to the stage 102 to move the stage 102. In this case, it is possible to perform scanning through the movement of the sample 200 loaded onto the stage 102.

The measuring unit 130 may include a light source unit 132 and light position detector 134 for detecting the motion of the cantilever 112. The light source unit 132 may irradiate light to the upper part of the cantilever 112. At this point, the position to which light is irradiated may be the upper part of one side of the cantilever 112 to which the probe 114 is connected. The light irradiated from the light source unit 132 may be reflected from the upper part of the cantilever 112. The light position detector 134 may detect the reflected light. Through the light reflected from the upper part of the cantilever 112, the motion of the cantilever 112 may be detected. The light irradiated from the light source unit 132 may include a laser.

The control unit 140 may acquire the surface information on the sample 200 by using the motion of the cantilever 112 received from the light position detector 134. Also, the control unit 140 may control the motion of the cantilever 112 by using the acquired surface information on the sample 200.

The display unit 150 may display, as an image, the surface information on the sample 200 received from the control unit 140.

Figure 2:
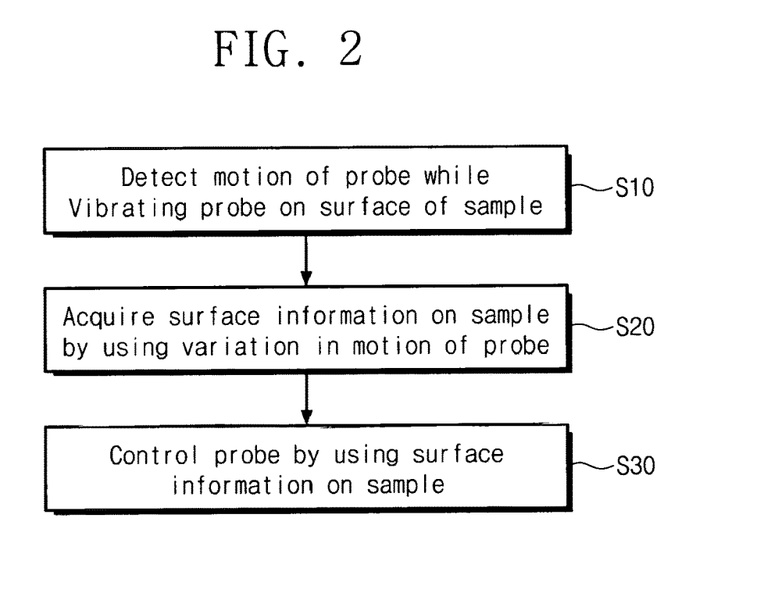
FIG. 2 is a flowchart for describing a measuring method for an AFM according to an embodiment of the inventive concept.

The measuring method for the AFM according to an embodiment of the inventive concept may be performed by using the AFM that has been described with reference to FIG. 1. FIG. 2 is a flowchart for describing the measuring method for the AFM according to an embodiment of the inventive concept. Referring to FIG. 2, the measuring method for the AFM may include detecting the motion of a probe while vibrating the probe on the surface of a sample in step S10, acquiring surface information on the sample by using a variation in the motion of the probe in step S20, and controlling the probe by using the surface information on the sample in step S30.

For the convenience of description, the positional relationship between the probe and the sample is described based on three orthogonal axes, i.e., X- and Y-axis parallel to the surface of the sample and Z-axis corresponding to the height direction of the sample. Herein, the X-axis is defined as a direction in which the probe scans the surface of the sample.

In order to measure the surface information on the sample 200 with the AFM according to an embodiment of the inventive concept, the probe 114 may approach the surface of the sample 200. Here, the sample 200 may be a substrate or wafer having a surface on which the integrated circuit pattern of a semiconductor device is fabricated. The measuring of the surface of the sample 200 using the AFM may be performed on one measuring region of the surface of the sample 200.

Figure 3:
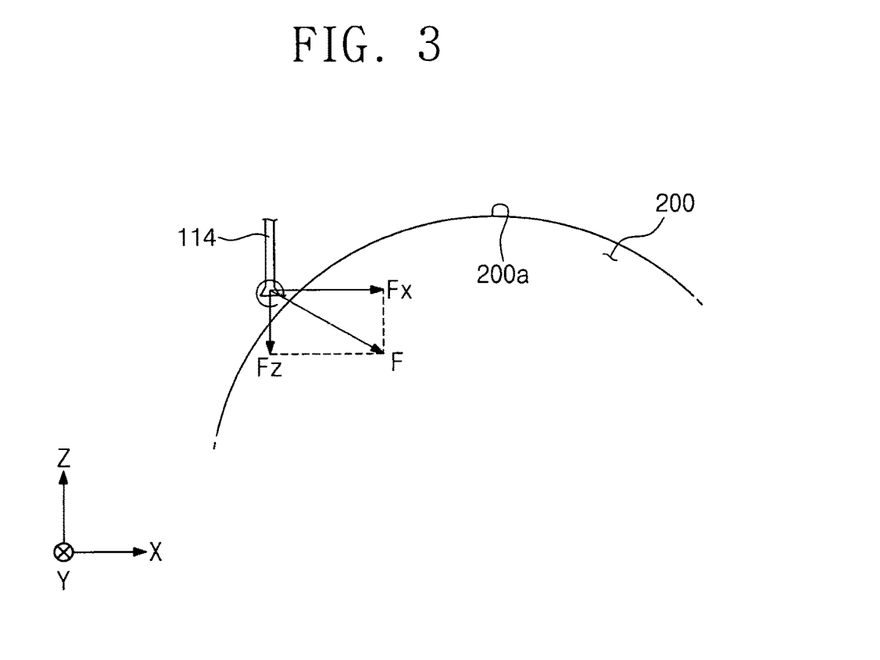
FIG. 3 is a drawing for describing the vibration of the probe of an AFM according to an embodiment of the inventive concept.

It is possible to detect the motion of the probe 114 while vibrating the probe 114 on the surface of the sample 200 in step S10. FIG. 3 is a drawing for describing the vibration of the probe of the AFM according to an embodiment of the inventive concept. Referring to FIGS. 1 and 3, the probe 114 may come close to the surface of the sample 200 to vibrate. At this point, the vibration of the probe 114 may be dithering that performs a circular motion on the surface of the sample 200. At this point, the probe 114 may perform a circular motion around an axis parallel to Y-axis. The circular motion of the probe 114 may be implemented in the oscillating unit 122 that include a first oscillating unit (not shown) and a second oscillating unit (not show). For example, the first oscillating unit (not shown) may vibrate the probe 114 in X-axis direction (i.e., in the scan direction of the probe 114). The second oscillating unit (not shown) may vibrate the probe 114 in Z-axis direction (i.e., in the height direction of the sample 200). At this point, the vibrations that are made by the first oscillating unit (not shown) and the second oscillating unit (not shown) may have the same frequency and amplitude and mutually have a phase difference of about 90°. For example, the vibrations that are made by the first oscillating unit (not shown) and the second oscillating unit (not shown) may be given by Equations (1) and (2) below:

$$X = D \cdot \cos(2\pi \cdot f \cdot t) \quad (1)$$

$$Z = D \cdot \sin(2\pi \cdot f \cdot t) \quad (2)$$

where X denotes the displacement of the X-axis direction of the probe 114 from the central axis of a circular motion, Z denotes the Z-axis direction of the probe 114 from the central axis of the circular motion, D denotes amplitude, f denotes frequency, and t denotes time. Thus, the first oscillating unit (not shown) and the second oscillating unit (not shown) may allow the probe 114 to perform a circular motion. The vibrations that are made by the first oscillating unit (not shown) and the second oscillating unit (not shown) may have a frequency of about 100 kHz to about 1 MHz.

While the probe 114 vibrates, the probe 114 may approach the surface of the sample 200. At this point, the sample 200 and the probe 114 may interact. For example, when the distance between the surface of the sample 200 and the probe 114 varies, the attractive force F between the surface of the sample 200 and the probe 114 may vary. Thus, the vibration of the probe 114 may vary in frequency, amplitude or phase. Here, the attractive force F between the surface of the sample 200 and the probe 114 is generated in a direction parallel to the normal vector of the surface of the sample 200, variations in the frequency, amplitude and phase of the vibration of the probe 114 correspond to a variation in the attractive force F between the surface of the sample 200 and the probe 114. Since the probe 114 of the AFM according to an embodiment of the inventive concept performs a circular motion around an axis parallel to the Y-axis, the vibration thereof may include elements concerning the X-axis direction and the Z-axis direction. Thus, the probe 114 may detect both attractive force FX in the X-axis direction and attractive force FZ in the Z-axis direction. In other words, by the interaction between the surface of the sample 200 and the probe 114, the frequency, amplitude or phase of the vibration of the probe 114 (i.e., the circular motion of the probe 114). Through a variation in the frequency, amplitude or phase of the vibrations that are made by the first oscillating unit and the second oscillating unit (not shown), the intensity and direction of the attractive force F between the surface of the sample 200 and the probe 114 may be acquired. By using this, surface information on the sample 200 (e.g., the position of a measurement point on the sample 200 and a surface slope at the measurement point) may be acquired. According to an embodiment, a process in which the probe 114 detects the surface of the sample 200 may be performed in a single vibration cycle of the vibration of the probe 114.

Figure 4:
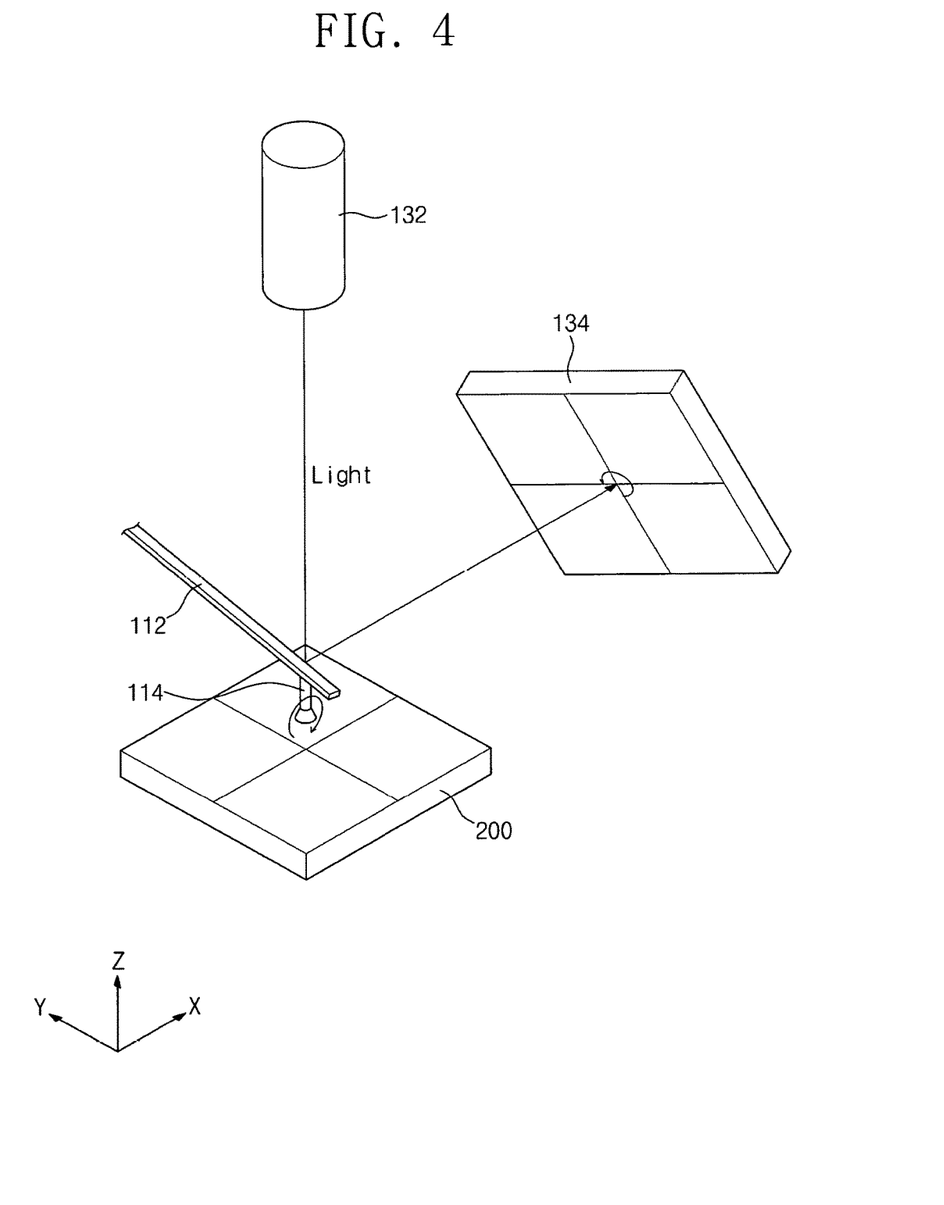
FIG. 4 is a drawing for describing the detection of the surface of a sample using an AFM according to an embodiment of the inventive concept.

It is possible to acquire the surface information on the sample 200 by using a variation in the motion of the probe 114 in step S20. FIG. 4 is a drawing for describing the detection of the surface of the sample using the AFM according to an embodiment of the inventive concept. Referring to FIGS. 1 and 4, by the interaction between the surface of the sample 200 and the probe 114, the frequency, amplitude or phase of the vibration of the probe 114 (i.e., dithering performing a circular motion) may vary. The bending level of the cantilever 112 to which the probe 114 is connected or the variations in the frequency, amplitude and phase of the probe 114 may be measured with the light source unit 132 and the light position detector 134. For example, as the probe 114 performs a circular motion, the position of the light detected by the light position detector 134 may also perform a circular motion. At this point, when the vibration of the probe 114 varies, the position of the laser detected by the light position detector 134 may also vary. Accordingly, data on a variation in the frequency, amplitude or phase of each of the vibration in the X-axis direction by the first oscillating unit (not shown) and the vibration in the Z-axis direction by the second oscillating unit (not shown) may be collected.

The control unit 140 may receive data from the light position detector 134 to acquire the intensity and direction of the attractive force between the sample 200 and the probe 114. For example, the control unit 140 may calculate the intensity and direction of the attractive force between the sample 200 and the probe 114 through the variation in the frequency, amplitude or phase of each of the vibration in the X-axis direction by the first oscillating unit (not shown) and the vibration in the Z-axis direction by the second oscillating unit (not shown). Accordingly, the control unit 140 may acquire surface information on a measurement point on the surface of the sample 200. The control unit 140 may use the position of the probe 114 and the intensity of the attractive force between the sample 200 and the probe 114 to acquire the position of the measurement point. For example, the control unit 140 may control the moving unit 124 so that the intensity of the attractive force between the sample 200 and the probe 114 is constant and accordingly, the probe 114 may be controlled to have a constant distance to the surface of the sample 200. At this point, the height of the probe 114 corresponds to the height of the surface of the sample 200. The control unit 140 may use the direction of the attractive force between the sample and the probe 114 to calculate the slope of a surface at a measurement point. For example, the control unit 140 may acquire the normal vector of the surface of the sample 200 through the direction of the attractive force.

It is possible to use surface information on the sample 200 to control the probe 114 in step S30. Specifically, controlling the cantilever 112 by using the surface information on the sample 200 may include modifying the movement path of the probe 114 through a feed forward algorithm, and moving the probe 114 along the modified movement path.

Figure 5:
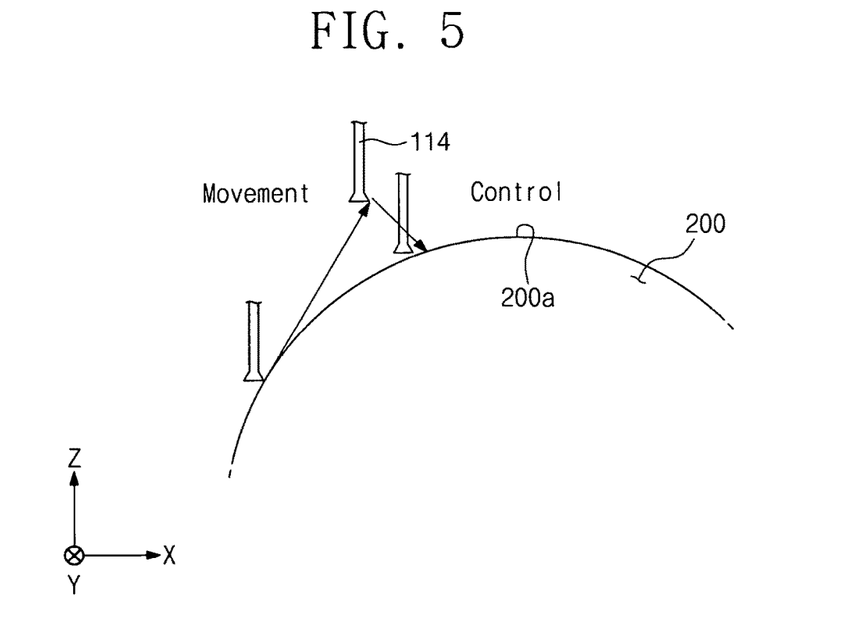
FIG. 5 is a drawing for describing the control of the probe of an AFM according to an embodiment of the inventive concept.

FIG. 5 is a drawing for describing the control of the probe of the AFM according to an embodiment of the inventive concept. Referring to FIGS. 1 and 5, the control unit 140 may modify the movement path of the probe 114 through the feed forward algorithm by using measurement information on a measured measurement point. In other words, the control unit 140 may modify the movement path of the probe 114 according to the slope of the surface of the sample 200 that has been acquired (i.e., in the normal direction of the surface of the sample 200). The control unit 140 may control the moving unit 124 to move the probe 114 moved along the modified path to a desired position according to the contour of the surface of the sample 200. For example, the control unit 140 may control the moving unit 124 to scan the probe 114 in the X-axis direction while controlling the distance between the probe 114 and the sample 200. At this point, the probe 114 moves along the height of the surface of the sample 200 and the control unit 140 may transmit image information on the height of each recorded position to the display unit 150. The display unit 150 may receive the image information from the control unit 140 to display an image that represents the shape of surface of the sample 200.

Also, the control unit 140 may sequentially perform detecting the motion of the probe 114 while vibrating the probe 114 on the surface of the sample 200, acquiring surface information on the sample 200 by using a variation in the motion of the probe 114, and controlling the probe 114 by using the surface information on the sample 200, in a single vibration cycle of the vibration of the probe 114 (i.e., dithering performing a circular motion).

In the following, the scanning process of the probe of the AFM according to an embodiment of the inventive concept is described in more detail. In order to help to understand the inventive concept, a description is provided by the comparing of the scanning of the probe of the AFM according to an embodiment of the inventive concept with the scanning of a typical AFM.

Figure 6A:
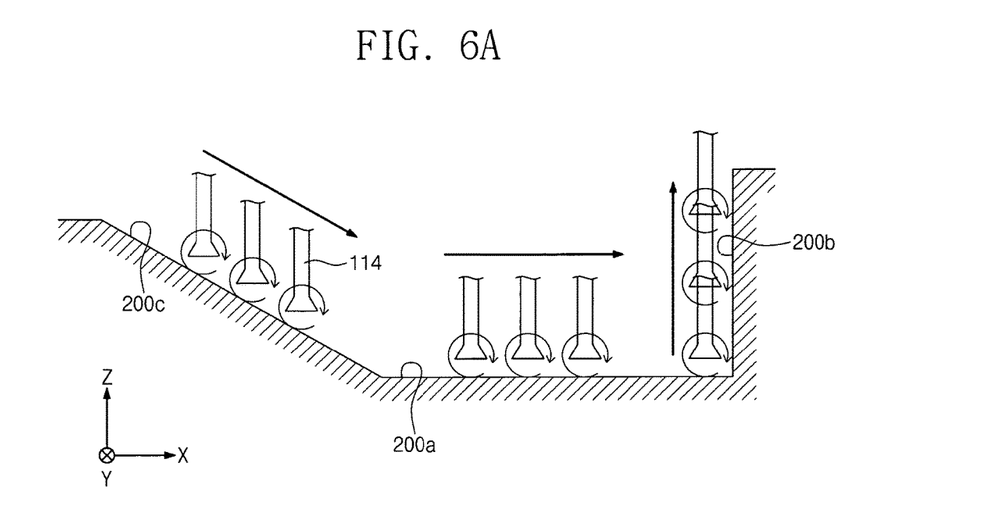
FIG. 6A is a drawing for describing the scanning of an AFM according to an embodiment of the inventive concept.
Figure 6B:
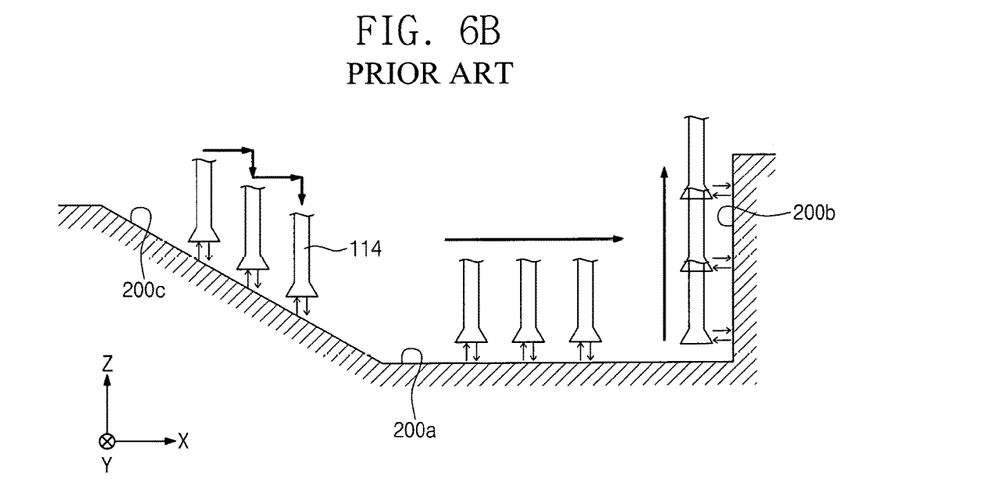
FIG. 6B is a drawing for describing the scanning of the probe of a typical AFM.

The probe 114 may scan the sample 200 in one direction while performing dithering. FIG. 6A is a drawing for describing the scanning of the AFM according to an embodiment of the inventive concept. FIG. 6B is a drawing for describing the scanning of the probe of a typical AFM. In the case where each component in the typical AFM corresponds similarly to the inventive concept, it is referred to in the same manner as the term used in the inventive concept. The sample 200 may include a 3D structure disposed on a substrate, such as a wafer. For example, the sample 200 may have a first surface 200a substantially parallel to the top surface of the stage 102, a second surface 200b that is a sidewall perpendicular to the top surface of the stage 102, and a third surface 200c that is at an angle to the top surface of the stage 102.

According to an embodiment of the inventive concept, referring to FIG. 6A, the probe 114 may move across the sample 200 in one direction (i.e., X-axis direction). In all the cases where the first surface 200a substantially parallel to the top surface of the stage 102, the second surface 200b that is a sidewall perpendicular to the top surface of the stage 102, and the third surface 200c that is at an angle to the top surface of the stage 102 are detected, the probe 114 performs scanning along the surface of the sample 200 while performing dithering performing a circular motion. That is, the probe 114 moves according to the slope of the surface of the sample 200, and the probe 114 may perform detection on the surface of the sample 200 by using only dithering performing a circular motion without a variation in dithering.

In comparison, a typical AFM generally uses two dithering types according to the surface of the sample 200. Referring to FIG. 6B, the probe 114 of the typical AFM comes close to the surface of the sample 200, vibrates in the X-axis direction or in the Z-axis direction, and detects the sample 200. For example, when detecting the first surface 200a substantially parallel to the top surface of the stage 102, the probe 114 performs scanning along the surface of the sample 200 while vibrating in the Z-axis direction. For example, when detecting the second surface 200b that is a sidewall perpendicular to the top surface of the stage 102, the probe 114 performs scanning along the surface of the sample 200 while vibrating in the X-axis direction. For example, when detecting the third surface 200c that is at an angle to the top surface of the stage 102, the probe 114 performs stepwise scanning along the surface of the sample 200 while vibrating in the Z-axis direction. That is, the typical AFM should change the dithering of the probe 114 according to the slope of the surface of the sample 200. Thus, it takes a lot of time for the probe 114 to detect the shape of the surface of the sample 200, and there may be a frequent collision between the probe 114 and the sample 200. Also, since the probe 114 vibrates in only a straight-line direction, only a component corresponding to force parallel to a vibration direction of the attractive force between the sample 200 and the probe 114 is detected. Thus, the typical AFM have no choice but to arithmetically acquire the slope of the surface of the sample 200 through the detection of may measurement points. Thus, the typical AFM predicts the surface of the sample 200 to move along the surface of the sample 200, and needs a lot of control to allow the control unit 140 to modify the movement path of the probe 114 to move to a desired position.

The measuring method for the AFM according to the inventive concept may acquire the shape (i.e., position and slope) of a surface during a single vibration cycle of the vibration of the probe, and enable the control unit to acquire an optimal probe movement path through a feed forward algorithm. Thus, by acquiring the optimal probe movement path, a collision between the probe and the sample may reduce. Thus, the AFM according to an embodiment of the inventive concept may reduce the abrasion of the probe and increase lifespan. Also, the measuring method for the AFM according to the inventive concept may minimize feedback control through proportional integral derivative (PID) control in comparison to the typical AFM that needs to further control to a desired position along the contour of a surface after the moving of the probe. Thus, the measuring method for the AFM according to an embodiment of the inventive concept uses artificial intelligence control, so quick stable control is possible.

The measuring method for the AFM according to embodiments of the inventive concept may perform measurement by using only a single vibration performing a circular motion, without changing a vibration according to the slope of the surface of the sample. Accordingly, it is possible to reduce the abrasion of the probe and enhance accuracy in measurement. Also, it is possible to acquire the slope of the surface within a single vibration cycle of the probe. Accordingly, since it is possible to acquire the optimal probe movement path through the feed forward algorithm, quick stable control and accurate scanning are possible.

While embodiments of the inventive concept are described with reference to the accompanying drawings, a person skilled in the art would be capable of understanding that the inventive concept may be practiced in other particular forms without changing technical spirits or essential characteristics. Therefore, embodiments described above should be understood as illustrative and not limitative in every aspect.

What is claimed is:

1. A measuring method for an atomic force microscope that scans a surface of a sample with a probe to measure a surface property of the sample, the measuring method comprising:
   detecting a motion of the probe while vibrating the probe on the surface of the sample;
   acquiring surface information on the sample by using a variation in the motion of the probe wherein the surface information on the sample comprises a position and a slope of the surface; and
   controlling the probe by using the surface information on the sample,
   wherein the vibrating the probe on the surface of the sample comprises performing a circular motion of the probe around an axis perpendicular to both a scan direction of the probe and a height direction of the sample.

2. The measuring method of claim 1, wherein the circular motion of the probe is provided by a first oscillator that makes a vibration in the scan direction of the probe, and a second oscillator that makes a vibration in the height direction of the sample.

3. The measuring method of claim 2, wherein a first vibration generated by the first oscillator and a second vibration generated by the second oscillator have a same frequency and a same amplitude, wherein the first vibration has a phase difference of about 90° with respect to the second vibration.

4. The measuring method of claim 3, wherein the first vibration and the second vibration have a frequency of about 100 kHz to about 1 MHz.

5. The measuring method of claim 1, wherein the acquiring the surface information on the sample by using the variation in the motion of the probe is performed in a single vibration cycle of the probe.

6. The measuring method of claim 5, wherein the acquiring the surface information on the sample by using the variation in the motion of the probe comprises:
   measuring a variation in a frequency, amplitude or phase in the scan direction of the probe from the circular motion of the probe;
   measuring a variation in a frequency, amplitude or phase in the height direction of the sample from the circular motion of the probe;
   calculating a variation in interaction between the surface of the sample and the probe through the variation in the frequency, amplitude or phase of the circular motion of the probe; and
   acquiring the slope of the surface through the variation in the interaction between the surface of the sample and the probe.

7. The measuring method of claim 1, wherein the controlling the probe by using the surface information on the sample comprises:
   modifying a movement path of the probe through a feed forward algorithm; and
   moving the probe along the modified movement path.

8. The measuring method of claim 7, wherein the feed forward algorithm is configured to modify the movement path using measurement information on the surface of the sample such that a direction of movement of the probe follows a direction of tangent line of the surface of the sample at each measurement point.

9. The measuring method of claim 1, wherein the detecting, the acquiring, and the controlling are automatically performed by at least one processor included in the atomic force microscope.

* * * * *